April 19, 1960

T. P. BARNARD 2,932,965

BALL SURFACE QUALITY GAGE

Filed March 11, 1957

INVENTOR
THEODORE P. BARNARD
BY Pennie, Edmonds,
Morton, Barrows and Taylor
ATTORNEYS April 19, 1960         T. P. BARNARD         2,932,965
BALL SURFACE QUALITY GAGE Filed March 11, 1957         2 Sheets-Sheet 2

INVENTOR
THEODORE P. BARNARD
BY Pennie, Edmunds,
Morton, Barrows, and Taylor
ATTORNEYS

United States Patent Office 2,932,965
Patented Apr. 19, 1960

2,932,965
BALL SURFACE QUALITY GAGE

Theodore P. Barnard, Keene, N.H., assignor to Miniature Precision Bearings, Inc., Keene, N.H., a corporation of New Hampshire Application March 11, 1957, Serial No. 645,210

9 Claims. (Cl. 73—9)

The present invention relates to an instrument for testing the surface quality of ball elements of the type employed in ball bearings, and more particularly to such an instrument adapted to transform ball surface imperfections into a readily measurable torque quantity accurately representative of ball surface quality.

To effect this transformation the invention provides a housing upon which a lower rotor member is rotatably mounted about its axis. The rotor member has a substantially optically-flat upper surface which is substantially horizontally oriented so that the ball elements may be disposed thereon along a pitch circle having a preselected radius from the rotor axis. The invention further provides an upper rotor member having a substantially optically-flat lower surface. The upper rotor member is rotatably mounted coaxially with the lower rotor member with its lower surface resting on the ball elements. In this manner rotation of the lower rotor member will transmit a torque to the upper rotor member through the ball elements disposed therebetween.

Since the optical flats have very nearly perfect surface finishes due to their amorphous structure this transmitted torque is due almost entirely to the surface imperfections of the ball elements. The surface imperfections produce transient pulses of torque which continuously vary about an average torque at a frequency dependent upon the angular velocity of the lower rotor member. Ball elements with an inferior surface finish cause transient deviations from the average torque level which are larger than those with a superior surface finish. By measuring and recording these transient deviations it is thus possible to evaluate surface finish in terms of torque level.

Measurement of the transmitted torque is effected by providing means for restraining the upper rotor member while driving the lower rotor member, the restraining means being adapted to provide a measurement of the torque required to effect such restraint. To this end the invention provides a spring-loaded prod member affixed to the housing and projecting therefrom. Means are provided for maintaining the prod member in contact with the upper rotor member, the spring bias on the prod member being such as to restrain rotation of the upper rotor member. In this way the restraining torque applied to the upper rotor member may be measured in terms of deflection of the prod member.

To accurately measure ball surface quality the instrument response must be linear through the range of frequencies characteristic of the transient pulses of transmitted torque. The natural or resonant frequency, $f_r$, of the system comprising the upper rotor member and the restraining prod member must therefore be maintained high enough so that the pulse repetition frequencies do not stimulate the system near or above its natural frequency. Such stimulation would result in a distortion of the magnitude of the imperfections and thus destroy the utility of the device.

The period, $T_r$, of this resonant frequency is proportional to the moment of inertia of the rotor member I, and spring constant of the prod member $k$, in accordance with the equation $$T_r = 2\pi\sqrt{I/k}$$

Thus the lower the moment of inertia I, and the higher the spring constant $k$, the greater the resonant frequency of the system.

A light rotor possessing a low moment of inertia is additionally advantageous in that it can be readily initiated to movement by the pulses of transmitted torque thus resulting in an instrument of greater sensitivity.

A large spring constant is additionally advantageous in that it affords a greater damping of rotor motion thus preventing overshoot. Such damping is particularly necessary with a light rotor having a greater tendency to accelerate into overshoot.

On the other hand, a large spring constant is disadvantageous in that it results in a lowering of instrument sensitivity.

To maintain a large spring constant with the consequent advantages of a light upper rotor member and high resonant frequency, and at the same time maintain instrument sensitivity at the high level required for the accurate measurement of ball surface quality the present invention provides a unique upper rotor member-prod member arrangement.

In accordance with this arrangement the upper rotor member is provided with a guide surface disposed substantially within an imaginary plane passing perpendicularly through the optically-flat lower surface in alignment with a diameter thereof. The prod member is adapted to be adjustably positioned at preselected positions along this guide surface. In this way the moment arm extending from the rotor axis to the prod member may be varied at will. If the prod member is moved toward the axis the force thereat is increased while movement away from the axis decreases this force. This arrangement thus permits the selection of an optimum mechanical gain for the system as determined by balancing the factors of resonant frequency and sensitivity for a particular surface quality measurement.

The present invention further specifies that at least a portion of the guide surface be so disposed that the available moment arm may be varied through a range substantially equal to and shorter than the radial distance from the ball element pitch circle to the rotor axis. It has been found that this range is particularly critical in the selection of an optimum mechanical gain permitting the employment of a high spring constant for the prod member. Accordingly, in the invention, at least a portion of the guide surface is disposed within a volume bounded by the axis of the rotor members and an imaginary cylindrical surface passing perpendicularly through the ball element pitch circle.

The invention can best be understood by referring to the following drawings in which.

Figure 1:
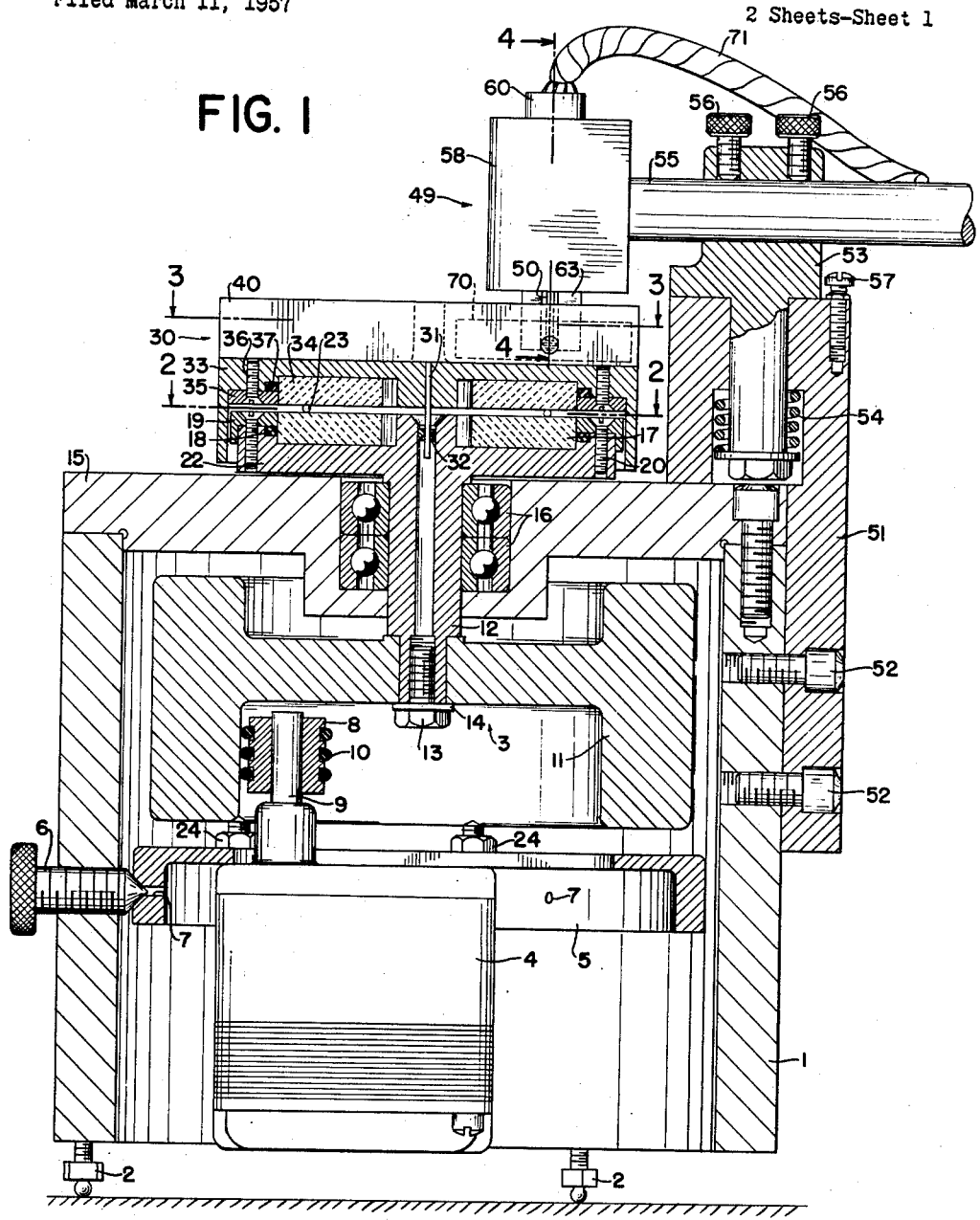
Fig. 1 is an elevation view partly in cross-section of an embodiment of the ball surface quality gage of this invention.

Referring to Fig. 1 the ball surface quality gage comprises a housing 1 supported by means of leveling screws 2. A rotor member indicated generally at 3 is rotatably mounted on the housing. Supporting means are also provided by the housing for an electric motor 4 adapted to rotatably drive the lower rotor member 3. The drive motor support comprises a bracket 5 which is maintained in position by means of thumb screws 6 threaded through the housing into openings 7 provided in the bracket. The electric drive motor 4 is attached to the brackets by means of bolts 24. A friction drive member 8 circumscribed by rubber O-rings 10 is affixed to the shaft 9 of the drive motor.

The rotor member 3 generally comprises a shaft member 12 and a counterweight 11. The counterweight is attached to the shaft by means of screws 13 and washer 14 which wedge the counterweight against a shoulder of the shaft. The shaft 12 is rotatably mounted on the housing by means of cover plate 15 bolted onto the housing and ball bearing members 16 inserted between the cover plate and the shaft. A driving torque is applied to the shaft member 12 from the drive motor 4 by arranging the O-rings of drive member 8 against the counterweight 11.

Upon emerging above the cover plate 15 the shaft member 12 projects laterally outward to form a disk-shaped cup 22 having an annular depression therein and arranged symmetrically about the rotor axis. An annular glass member 17 having a substantially optically-flat upper surface is fitted within the depression. A second annular depression surrounding the glass member 17 is provided in the outer lip of the cup and an O-ring 18 inserted therein. The diameter of the O-ring is slightly larger than the depth of the second depression. In this manner a retaining ring 19 pressed against the outer lip of the cup by means of screws 20 expands the O-ring laterally against the glass member thus frictionally maintaining the glass member in position in the cup depression.

Figure 2:
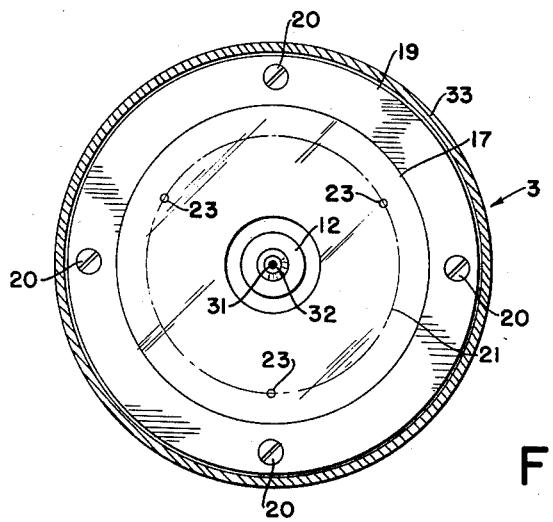
Fig. 2 is a view of the lower rotor member employed in Fig. 1 taken along line 2—2.

A top view of the lower rotor member 3 is provided in Fig. 2 taken along line 2—2 of Fig. 1. As is seen in this figure the rotor member is provided with a pitch circle 21 having a preselected radius from the axis of the rotor member. The pitch circle is employed as a reference for positioning the ball elements 23 to be tested. Advantageously the pitch circle is inscribed in the cup depression so as to be visible through the glass member 17. It is undesirable to inscribe the pitch circle in the upper surface of the glass member since the invention prescribes that such surface should be optically flat.

An upper rotor member, indicated generally at 30, is rotatably mounted coaxially with said lower rotor member 3. To this end, a pin 31 is supported in alignment with the axis of the lower rotor member 3 by means of jewel bearing 32. The upper rotor member is provided with an axial bore adapted to mate with the pin. In this manner, lateral restraint, centering the upper rotor member in rotative coaxial relationship with the lower rotor member, is provided.

The upper rotor member 30 comprises a disk-shaped cup member 33 having an annular depression therein and arranged symmetrically about its axis. An annular glass member 34 having a substantially optically-flat lower surface is fitted within the depression. The glass member is locked within the cup depression by means of retaining ring 35, screws 36, and O-ring 37, in the same manner as is glass member 17.

The entire weight of the upper rotor member 30 rests upon the ball elements 23, no other vertical restraint being provided in the instrument. In this way, a torque is transmitted from the rotating lower rotor member through the ball elements to the upper rotor member. If the ball elements were disposed between perfect surface finishes and they themselves were perfect geometrically and in surface finish, the torque transmitted to the upper rotor member would be constant. The substantially optically-flat upper and lower surfaces of the lower and upper rotor members, respectively, have very nearly perfect surface finishes due to the amorphous structure of glass. The balls, however, do not have a perfect surface finish. As a result their rolling action due to the turning of the lower rotor member causes the minute imperfections in their surfaces to transmit transient torques to the upper rotor member which vary about the average torque level. Thus in the normal case, the torque level is not constant but continuously varying about the average.

The similarity or homogeneity of balls within any normal production lot is well established and permits the use of a plurality of balls without destroying the validity of the instrument test. By measuring and recording the transient torque deviations from the average it is possible to compare the performance of one group of balls against another and to evaluate surface finish in terms of torque level. Standards may also be established as to the maximum transient torque deviation for a particular quality of ball surface finish.

Figure 3:
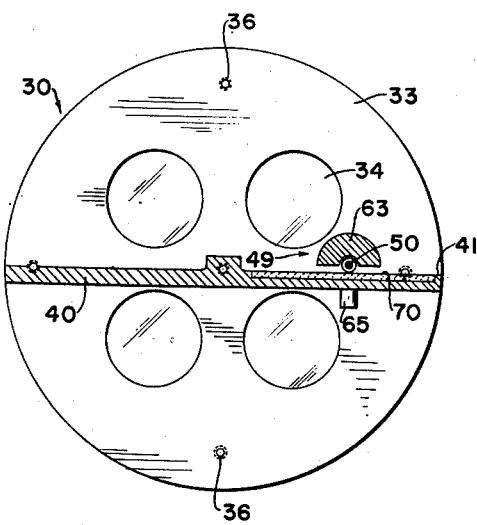
Fig. 3 is a view of the upper rotor member employed in Fig. 1 taken along line 3—3.

Measurement of the transmitted torque is effected by means provided to restrain rotation of the upper rotor member, the restraining means being adapted to produce an indication of the instantaneous torque required to effect such restraint. The present invention provides a unique arrangement for effecting such restraint and measurement. The arrangement is best shown in Fig. 3 in which a torque bar member 40 is affixed to the upper rotor member. The torque bar has a guide surface 41 substantially within a plane passing perpendicularly through the lower surface of glass member 34 in alignment with a diameter thereof. The torque bar and guide surface are substantially symmetrically distributed to either side of the rotor member axis. This provides in combination with the symmetrical upper rotor member substantially equal weight distribution upon the ball elements 23.

Figure 4:
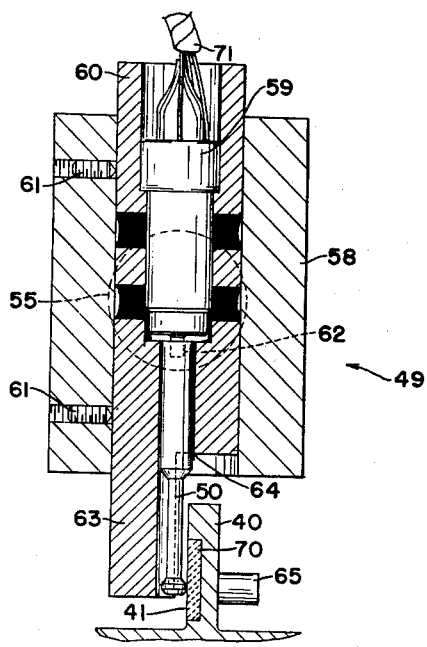
Fig. 4 is a view of the prod assembly employed in Fig. 1 taken along line 4—4.

The remainder of the rotation-restraining system includes a prod assembly 49 shown more clearly in Figs. 3 and 4. The prod assembly is affixed to the housing 1 through a bracket 51 and screws 52. A pivot mount 53 is supported within bracket 51 and frictionally retained in a selected position by spring 54. The prod assembly may thus be pivoted to one side to facilitate the removal and replacement of the upper rotor member. Stop screw 57 is provided to limit the rotation of pivot mount 53.

Pivot mount 53 has a horizontal bore through which a rod 55 is slidably mounted. Prod assembly 49 is attached to one end of the rod 55. The prod assembly may thus be adjustably positioned to preselected positions along the guide surface of the torque bar 40 and clamped into position by means of thumb screws 56.

The prod assembly 49 includes a transducer element 59 adapted to convert mechanical displacement of the guide surface 41 into electrical signals having a magnitude proportional to the displacement. A transducer member particularly suited for this purpose is R.C.A. Mechano-Electronic Transducer 5734. The transducer element is mounted within a non-magnetic shell 60 which slides within a housing 58 and is held therein by means of lock screws 61. The housing in turn is attached to rod 55.

The R.C.A. transducer includes a spring-loaded prod tip 62 to which is affixed a prod extension 50. The prod extension is maintained in contact with the guide surface 41 by means of magnet 65 to follow its movements regardless of the direction of rotation of the upper rotor member. The prod tip 62 is actually the plate member of a triode element within the transducer. Movement of tip 62 initiated by movement of prod extension 50 therefore displaces the plate from the grid and cathode members of the triode and produces an electrical signal which varies in magnitude in proportion to the mechanical displacement.

The prod tip 62 is spring loaded and arranged in contact with the guide surface 41 to restrain movement of the torque bar and therefore of upper rotor member 33. In addition, due to the spring loading, the mechanical displacement of the prod tip is proportional to the torque required to effect such restraint. The output electrical signal of the transducer therefore provides a measurement of this instantaneous restraining torque required to balance the torque transmitted through the ball elements to the upper rotor member, which measurement is indicative of the surface quality of the ball elements.

Specifications on the transducer provide for maximum permissible lateral movement of the prod tip 62. The prod shell 60 is therefore designed to restrict the lateral movement of prod extension 50. To this end, the shell 60 is provided with a longitudinal extension 63 which restricts movement of the prod member 50 in a direction away from the guide surface 41. Movement in the opposite direction is restricted by maintaining the diameter of the shell bore at point 64 at a predetermined maximum.

The electrical output signal from the transducer element is applied through cable 71 to electronic indicating circuitry adapted to measure the instantaneous magnitude of the signal. Advantageously the electronic circuitry is designed so that the triode plate in the transducer operates at zero potential. This avoids the necessity of insulating the transducer shell to prevent a short circuit between the prod extension and shell.

It has been found that considerable error is introduced into the electrical signal output of the transducer when the metal prod extension 50 is in contact with a metal guide surface. This is due to the crystalline structure of the two surfaces which tend to lock or seize as the two pieces chafe each other in contact. When a slight seizure or locking between the two surfaces occurs, vertical run-out of the lower plate, which is always present to some extent, forces the prod extension upward moving the plate in the transducer triode and adding a sinusoidal error signal to the output voltage of the transducer which causes considerable inaccuracy in the interpretation of ball surface quality.

This locking phenomenon also tends to lift one side of the upper rotor member slightly and thus changes the weight distribution of the rotor member on the ball elements further distorting the fidelity of the test.

To prevent the introduction of this error the present invention employs a glass member 70 to provide the guide surface of the torque bar. The amorphous structure of the glass member provides a smooth surface with a low coefficient of friction which overcomes the aforementioned problem.

The mounting arrangement of the prod assembly 49 in combination with the torque bar 40 permits movement of the prod assembly to a selected position along the guide surface 41. Moving the prod assembly toward the rotor axis increases the force at the prod extension while moving it outwardly reduces this force. In this way, the moment arm of the restraining torque applied to the torque bar may be varied at will providing a mechanical amplifier for the output transducer signal. Because this permits the selection of an optimum mechanical gain, the spring constant of the prod assembly may be maintained at a relatively high value. This stiff system permits the use of a light upper rotor member which in combination with the high spring constant provides a system with a high resonant frequency. The adjustable moment arm also permits the selection of a mechanical gain for optimum instrument sensitivity.

A force generated at the point of contact between a test ball element and the optical flats appears at the center of the upper rotor member as a torque which is a product of the force generated at the ball element times a first moment arm equal to the radius of the pitch circle. Thus, the larger the pitch circle the larger the torque at the axis of the upper rotor. In addition, a large diameter increases the stability of the upper rotor member and prevents binding of pin 31 on the jewel 32 due to side forces from the prod extension. A pitch circle of 2 inches in diameter has been found to be a practical expedient.

The torque at the axis of the upper rotor member is converted to a force at the prod extension which is equal to the torque divided by a second moment arm equal to the distance from the axis of rotation to the prod extension. It has been found that the selection of an optimum mechanical gain permitting proper coordination and balance of the factors of resonant frequency and sensitivity requires that the relationship of the second moment arm to the first moment arm be capable of being varied through a range of ratios substantially equal to and less than 1:1. This requires that at least a portion of the guide surface 41 be disposed within a volume defined by the rotor member axis and an imaginary cylindrical surface passing perpendicularly through the pitch circle of the ball elements, or passing perpendicularly through the periphery of the optically-flat surface of the upper rotor member if that periphery defines the pitch circle limit.

A preferred embodiment of the invention has been described. Various changes and modifications may be made in the scope of the invention as set forth in the appended claims.

I claim:

1. An instrument for testing the surface quality of ball elements comprising a housing, a lower rotor member having a substantially optically-flat upper surface, and rotatably mounted on said housing about its axis with its said upper surface substantially horizontally oriented, upon which said surface the said ball elements are disposed along a pitch circle having a preselected radius from the said axis of said rotor member, driving means mounted on said housing for rotating said lower rotor member, an upper rotor member having a substantially optically-flat lower surface, and rotatably mounted coaxially with said lower rotor member with its said lower surface resting upon the said ball elements, whereby rotation of the said lower rotor member transmits a torque to the said upper rotor member through the said ball elements therebetween, said upper rotor member having a guide surface disposed substantially within an imaginary plane passing perpendicularly through the said lower surface in alignment with a diameter thereof, at least a portion of said guide surface being disposed within a volume bounded by the said axis of said rotor members and an imaginary cylindrical surface passing perpendicularly through the said ball element pitch circle, a spring-loaded prod member affixed to said housing and projecting therefrom, means providing adjustment of said prod member to preselected positions along said guide surface including positions within said volume, means for maintaining said prod member in contact with said guide surface, said prod member being spring biased to restrain rotation of said guide surface and upper rotor member, and means for providing a measurement of the instantaneous torque applied by said prod member to said upper rotor member to restrain rotation thereof, said torque measurement being indicative of the surface quality of said ball elements.

2. An instrument for testing the surface quality of ball elements in accordance with claim 1 in which the said guide surface has an amorphous structure with a low coefficient of friction.

3. An instrument for testing the surface quality of ball elements in accordance with claim 2 in which the said guide surface is made of glass.

4. An instrument for testing the surface quality of ball elements comprising a housing, a lower rotor member having a substantially optically-flat upper surface, and rotatably mounted on said housing about its axis with its said upper surface substantially horizontally oriented, upon which said surface the said ball elements are disposed, driving means mounted on said housing for rotating said lower rotor member, an upper rotor member having a substantially optically-flat lower surface, and rotatably mounted coaxially with said lower rotor member with its said lower surface resting upon the said ball elements, whereby rotation of the said lower rotor member transmits a torque to the said upper rotor member through the said ball elements therebetween, said upper rotor member having a guide surface disposed substantially within an imaginary plane passing perpendicularly through the said lower surface in alignment with a diameter thereof, at least a portion of said guide surface being disposed within a volume bounded by the said axis of said rotor members and an imaginary cylindrical surface passing perpendicularly through the periphery of the said lower surface, a spring-loaded prod member affixed to said housing and projecting therefrom, means providing adjustment of said prod member to preselected positions along said guide surface including positions within said volume, means for maintaining said prod member in contact with said guide surface, said prod member being spring biased to restrain rotation of said guide surface and said upper rotor member, and means for providing a measurement of the instantaneous torque applied by said prod member to said upper rotor member to restrain rotation thereof, said torque measurement being indicative of the surface quality of said ball elements.

5. An instrument for testing the surface quality of ball elements comprising a housing, a lower rotor member having a substantially optically-flat upper surface, and rotatably mounted on said housing about its axis with its said upper surface substantially horizontally oriented, upon which said surface the said ball elements are disposed along a pitch circle having a preselected radius from the said axis of said rotor member, driving means mounted on said housing for rotating said lower rotor member, an upper rotor member having a substantially optically-flat lower surface, and rotatably mounted coaxially with said lower rotor member with its said lower surface resting upon the said ball elements, whereby rotation of the said lower rotor member transmits a torque to the upper rotor member through the said ball elements therebetween, a torque bar affixed to said upper rotor member having a guide surface disposed substantially within an imaginary plane passing perpendicularly through the said lower surface in alignment with a diameter thereof, at least a portion of said guide surface being disposed within a volume bounded by the said axis of said rotor members and an imaginary cylindrical surface passing perpendicularly through the said ball element pitch circle, a spring-loaded prod member affixed to said housing and projecting therefrom, means providing adjustment of said prod member to preselected positions along said guide surface including positions within said volume, means for maintaining said prod member in contact with said guide surface, said prod member being spring biased to restrain rotation of said guide surface and upper rotor member, and means for providing a measurement of the instantaneous torque applied by said prod member to said upper rotor member to restrain rotation thereof, said torque measurement being indicative of the surface quality of said ball elements.

6. An instrument for testing the surface quality of ball elements in accordance with claim 5 in which the said guide surface has an amorphous structure with a low coefficient of friction.

7. An instrument for testing the surface quality of ball elements comprising a housing, a lower rotor member having a substantially optically-flat upper surface, and rotatably mounted on said housing about its axis with its said upper surface substantially horizontally oriented, upon which said surface the said ball elements are disposed, driving means mounted on said housing for rotating said lower rotor member, an upper rotor member having a substantially optically-flat lower surface, and rotatably mounted coaxially with said lower rotor member with its said lower surface resting upon the said ball elements, whereby rotation of the said lower rotor member transmits a torque to the upper rotor member through the said ball elements therebetween, a torque bar affixed to said upper rotor member having a guide surface disposed substantially within an imaginary plane passing perpendicularly through the said lower surface in alignment with a diameter thereof, at least a portion of said guide surface being disposed within a volume bounded by the said axis of said rotor members and an imaginary cylindrical surface passing perpendicularly through the periphery of the said lower surface, a spring-loaded prod member affixed to said housing and projecting therefrom, means providing adjustment of said prod member to preselected positions within said volume, means for maintaining said prod member in contact with said guide surface, said prod member being spring biased to restrain rotation of said guide surface and upper rotor member, and means for providing a measurement of the instantaneous torque applied by said prod member to said upper rotor member to restrain rotation thereof, said torque measurement being indicative of the surface quality of said ball elements.

8. An instrument for testing the surface quality of ball elements comprising a housing, a lower rotor member having a substantially optically-flat upper surface, and rotatably mounted on said housing about its axis with its said upper surface substantially horizontally oriented, upon which said surface the said ball elements are disposed along a pitch circle having a preselected radius from the said axis of said rotor member, driving means mounted on said housing for rotating said lower rotor member, an axially symmetrical upper rotor member having a substantially optically-flat lower surface, and rotatably mounted coaxially with said lower rotor member with its said lower surface resting upon the said ball elements, whereby rotation of the said lower rotor member transmits a torque to the said upper rotor member through the said ball elements therebetween, a torque bar affixed to said upper rotor member having a guide surface disposed substantially within an imaginary plane passing perpendicularly through the said lower surface in alignment with a diameter thereof, said torque bar being substantially symmetrically distributed to either side of the said rotor member axis, at least a portion of said guide surface being disposed within a volume bounded by the said axis and an imaginary cylindrical surface passing perpendicularly through the said ball element pitch circle, a spring-loaded prod member affixed to said housing and projecting therefrom, means providing adjustment of said prod member to preselected positions along said guide surface including positions within said volume, means for maintaining said prod member in contact with said guide surface, said prod member being spring biased to restrain rotation of said guide surface and upper rotor member, and means for providing a measurement of the instantaneous torque applied by said prod member to said upper rotor member to restrain rotation thereof, said torque measurement being indicative of the surface quality of said ball elements.

9. An instrument for testing the surface quality of ball elements comprising a housing, a lower rotor member having a substantially optically-flat upper surface, and rotatably mounted on said housing about its axis with its said upper surface substantially horizontally oriented, upon which said surface the said ball elements are disposed, driving means mounted on said housing for rotating said lower rotor member, an axially symmetrical upper rotor member having a substantially optically-flat lower surface, and rotatably mounted coaxially with said lower rotor member with its said lower surface resting upon the said ball elements, whereby rotation of the said lower rotor member transmits a torque to the said upper rotor member through the said ball elements therebetween, a torque bar affixed to said upper rotor member having a guide surface disposed substantially within an imaginary plane passing perpendicularly through the said lower surface in alignment with a diameter thereof, said torque bar being substantially symmetrically distributed to either side of the said rotor member axis, at least a portion of said guide surface being disposed within a volume bounded by the said axis and an imaginary cylindrical surface passing perpendicularly through the periphery of the said lower surface, a spring-loaded prod member affixed to said housing and projecting therefrom, means providing adjustment of said prod member to preselected positions along said guide surface including positions within said volume, means for maintaining said prod member in contact with said guide surface, said prod member being spring biased to restrain rotation of said guide surface and upper rotor member, and means for providing a measurement of the instantaneous torque applied by said prod member to said upper rotor member to restrain rotation thereof, said torque measurement being indicative of the surface quality of said ball elements.

References Cited in the file of this patent

UNITED STATES PATENTS

| | | |
|---|---|---|
| 2,776,561 | Brown | Jan. 8, 1957 |
| 2,785,566 | Mims | Mar. 19, 1957 |